Patented Apr. 10, 1945

2,373,461

UNITED STATES PATENT OFFICE 2,373,461

GASKET MATERIAL

Donald S. Crampton, Oak Park, Ill., assignor to Felt Products Manufacturing Co., Chicago, Ill., a corporation of Illinois No Drawing. Application April 20, 1942,
Serial No. 439,723

3 Claims. (Cl. 260—41)

The present invention relates to an improved gasket material comprising a lastic, asbestos, and mineral wool, together with other compounding ingredients to modify the properties of the material.

The gasket material of the present invention is particularly intended in connection with automotive machinery, such as motor cars, airplanes, military tanks, and the like, and is particularly adapted for that purpose because it is substantially nonhygroscopic, is resistant to oil, and not subject to serious distortion as the result of temperature changes or the influences of moisture either in the liquid form or as humidity.

One of the objects of the invention therefore is to provide a gasket material comprising a lastic, asbestos, and mineral wool, the latter preferably in the comminuted form, which gasket material may also contain vulcanizing agents, vulcanizing accelerators, high boiling hydrocarbons and a wax.

It has already been proposed in the past to prepare gasket materials on the basis of lastics. It may be stated in passing that the term "lastic," while of comparatively recent origin, has found wide acceptance in the industry as being a descriptive noun and covering the various types of artificial or synthetically produced rubbers and rubber compounds. The term has found its way into chemical dictionaries, and for example may be found on page 388 of the 1942 edition of "The Condensed Chemical Dictionary" published in New York, in which the material is described as "New materials of synthetic (as distinct from natural) origin which in the last few years have assumed considerable importance, from both technical and industrial standpoints... The so-called 'synthetic' rubbers are lastics, but not all lastics are synthetic rubbers." Among the materials enumerated by their various trade designations in connection with the term lastics are: "Ameripol," "Buna S," butyl rubber, "Chemigum," Glueglis, "Hycar," "Koroseal," Neoprene, "Perbunan," polybutene, "Pliofilm," "Thermoprene," "Thiokol," "Vistanex," etc. These lastics or synthetic rubbers are superior to natural rubber derived from natural latex in that they are resistant to oils and therefore can be used under conditions where ordinary or natural rubber could not be used. This is particularly true in connection with gaskets which are employed for sealing of the parts of automotive engines and particularly the transmissions and differentials thereof where the gasket is in constant contact with in some cases even heated hydrocarbon materials, such as lubricating oil, lubricating grease, motor fuel, Diesel fuel, and the like. It will be self-evident that if such a gasket contained ordinary rubber it would be rapidly destroyed by the solvent and swelling action of hydrocarbons on ordinary rubber.

It has also been proposed to produce gaskets from these lastics together with various fillers, but these gaskets had to have certain characteristics, particularly that of compressibility and re-expansion, so that when the parts between which the gaskets are placed are brought closer together by the tightening up of the bolts or rivets connecting them and they are under the influence of temperature changes, the gasket might be more strongly compressed and alternately less strongly compressed, so that if the gasket were of a permanently compressible type then as the parts pressed against each other with less force there would be a decided tendency for the development of leaks. This of course is intolerable, particularly under conditions of severe use, as in the military arts.

It has already been proposed to produce gaskets from lastics in which the gaskets were produced under pressure which, however, invariably led to a gasket material which would not possess the highly valuable property of compressibility followed by re-expansion. For example, gaskets have been prepared on the basis of lastics containing various fiber fillers, particularly asbestos, which was used because of its heat resistant nature, these gasket materials also containing organic fillers particularly of the nature of lignin. Such gaskets, while they would possess a certain kind of re-expansibility, would suffer from another and more serious drawback, namely, in that they were not stable as to size. This was occasioned by the well know hygroscopicity of the lignin which under the influence of moisture or atmospheric humidity would tend to absorb this moisture, hence causing the expansion of the gasket material. Therefore when making gaskets which were provided with a considerable number of bolt holes, these gaskets even though most accurately cut would, if the weather changed or if they were stored in moist surroundings, expand as much as three to five percent which self-evidently would throw the bolt holes out of register with the parts for which the gasket was designed. Under these conditions, the gaskets would prove unsuitable, or if they were used, would produce leaky joints.

After a great deal of experimentation, applicant has finally discovered an ingredient which could be substituted for the lignin but which would not impart to the gaskets thus made this undesirable property of changing dimensions under atmospheric conditions. The ingredient found was what is known as mineral wool or rock wool, by which term there are intended to be covered such materials as slag wool, silicate cotton, rock wool, glass wool, blown fibrous slag, and similar materials which are produced by the blowing of molten siliceous melts. These various materials all collectively herein designated as mineral wool are employed substantially in the form in which they are obtained from the producer or manufacturer, but by reason of the compounding methods employed will, as hereinafter will appear, become considerably reduced in size or comminuted. The mineral wool, however, will nevertheless retain its filamentous nature at least to the extent that the finer particles produced as a result of the breaking up of the longer filaments will nevertheless be characterized by having one dimension considerably greater than the other two. In other words, the material when examined under the microscope will be found to consist of what amounts to small rods which are definitely capable of orientation in the mixture and which orientation very probably plays a considerable part in imparting to the gasket material of the present invention its remarkable and desirable properties.

The compounding of the gasket material of the present invention may be carried on in the well known rubber mixing types of apparatus consisting of rolls whose distance from each other is capable of accurate adjustment and which revolve relative to each other with different peripheral speeds so as to produce a very thorough masticating and mixing action. The major ingredients of the composition consist of approximately 200 parts by weight of a synthetic rubber or lastic, preferably of the type known as Neoprene E and Hycar, or mixtures thereof, about 300 parts by weight of asbestos, and about 370 parts by weight of mineral wool, together with smaller amounts of carbon, hydrocarbon rubber softeners, stearic acid, and wax. There are also present small amounts of sulfur to act as a vulcanizing agent, and such materials as zinc oxide and litharge to act as accelerators for this vulcanizing effect.

Without limiting the invention to the exact formula herein given, it may be stated that a very successful exemplification of the invention results from the practice of the following example:

*Example*

In the following example all of the parts are parts by weight:

| | |
|---|---:|
| Neoprene E | 100 |
| Hycar | 100 |
| Vulcanized oil factice (Neophax) | 10 |
| Asbestos | 300 |
| Mineral wool | 370 |
| Thermatomic carbon (Thermax S) | 50 |
| Heavy hydrocarbon rubber softening oil | 35 |
| Stearic acid | 3 |
| Synprowax | 20 |
| Sulfur | 6 |
| Zinc oxide | 10 |
| Litharge | 10 |

Of the above recited materials, the Neoprene E is the trade designation of a synthetic rubber made from 2-chlorobutadiene 1,3 and is in the form of a brown-colored plastic solid. The Hycar is also a synthetic rubber which is understood to be a butadiene copolymer whose exact composition is not known but is possessed of excellent oil resistant properties, is of high tensile strength, and is capable of vulcanization. Hycar is produced by the conjoint polymerization of butadiene and acrylonitrile, thus being a butadiene-acrylonitrile copolymer. The Neophax is a fairly well known type of factice and is usually found on the market in the form of a dark brown cake. The material is infusible but is soluble in Neoprene and is used in connection therewith as a softener and extender. The mineral wool has already been described and is preferably employed in its natural form, becoming comminuted as a result of the friction and attrition of the rubber mixing rolls. The Thermax S is a form of Thermatomic carbon which has been developed and placed on the market by R. T. Vanderbilt and Company of New York. The hydrocarbon rubber softeners are preferably composed of a mixture of 25 parts of the Barrett Company's No. 10 solvent oil and ten parts of Socony Vacuum Company's heavy Neoprene process oil sold under their designation of "449." The Synprowax is a synthetic wax having the characteristics of Montan wax with a melting point of about 90° C., an acid value of 23.4, a saponification number of 78.5 and a solubility in naphtha of about 67.20%. The stearic acid is the well known product of commerce, hence requires no further description.

In practicing the present invention, the lastic, that is, the Neoprene and Hycar, are first placed on the rollers and allowed to become thoroughly blended, starting with cold rollers. After the two lastics have become thoroughly incorporated with each other, the Neophax factice is added, followed by the asbestos, rock wool, Thermax S, and the hydrocarbon rubber softening oils. It is advisable to mix these oils with the asbestos and the rock wool before gradually feeding this mixture to the material already on the rubber mill, as it seems that the presence of the rubber softening oil aids in the incorporation of the asbestos, the mineral wool and the Thermax S with the material on the rolls. Finally the stearic acid and the Synprowax are worked in, followed by the sulfur, the zinc oxide and litharge. Mixing is continued until the entire material is uniform, whereafter it is rolled out into sheets of the thickness of the finished gaskets. From the sheets thus obtained, the gaskets are cut, including the bolt holes, and these gaskets are then stacked up on forms having pins which protrude through the bolt holes. About ten gaskets can be placed on a form. These forms are then placed in a vulcanizing oven in which the temperature of the material is gradually raised from room temperature during a period of about six hours until it attains a temperature which is near but does not materially exceed 250° F., whereafter it is held at this maximum temperature for a period of about four additional hours, thus making a ten-hour curing time. During this time the sulfur and vulcanizing accelerators vulcanize the lastics in the material. It should be particularly noticed that this vulcanization or curing is accomplished at atmospheric pressure so that there is no compression of the gasket material during the curing stage. This is very important as it lends to the material the highly prized property of compressibility with resultant return after the pressure lessens. Furthermore, during the curing there seems to be a slight increase in the thickness of the material. In other words, it becomes slightly but definitely bloated and it may be that this bloating accounts at least in part for the properties of compressibility and re-expansion.

Another great advantage of the present invention lies in the fact that the stampings which are removed from the interior of the gasket area and from the bolt holes are still in the unvulcanized condition and therefore may be returned in their entirety to the next batch which is being worked on the rubber mixing rolls, so that in the manufacture of gaskets by the present process there is no waste of material whatsoever.

Furthermore, by utilizing entirely synthetic rubbers or lastics, the manufacture of the gaskets by the present method and in accordance with the present invention is entirely independent of the supply of natural rubber which under present war conditions is a substantially unobtainable material. The invention, moreover, is directly related to national defense because it is applicable to gaskets such as are employed in tanks, airplanes, and various types of war vehicles. The process is comparatively simple to operate, is inexpensive, and enables rapid fabrication particularly because the gaskets will not change their dimensions, so that when used on assembly lines they do not hold up the operation which would be the case if the gaskets were subject to serious dimensional variance.

While zinc oxide and litharge have been given as vulcanizing accelerators, it will be self-evident to anyone familiar with rubber compounding that there are many other substances which could be substituted for this purpose and also that the proportions may be considerably varied, depending upon the degree of flexibility desired in the gasket. Where the gasket can be used in stiffer form, the amount of asbestos or mineral wool, or both, may be considerably increased. On the other hand, where greater flexibility is desired, these materials may be used in diminished amounts. Another way of increasing the flexibility is to increase the amount of rubber softening oils so as to obtain a material which has less rigidity.

The methods of compounding are those well known in the art and should be thoroughly understood by anyone who is conversant with the manufacture of this type of material and hence requires neither illustration nor further elucidation.

The essential novelty in the present invention lies in the association of the mineral wool with the asbestos and the synthetic rubbers or lastics, whereby a material is obtained which has the desired properties without being subject to fluctuations in size, which are occasioned in the case of prior art products by the presence of hygroscopic materials such as lignin.

I claim:

1. A gasket material comprising major quantities of oil-resistant elastic sulfur-vulcanizable synthetic rubbery material from the group consisting of a 2,chlorobutadiene 1,3 polymer and a butadiene acrylonitrile copolymer; asbestos and comminuted mineral wool; and relatively small quantities of vulcanizers and modifying agents.

2. Gasket material comprising about 200 parts by weight of oil-resistant elastic sulfur-vulcanizable synthetic rubbery material from the group consisting of a 2,chlorobutadiene 1,3 polymer and a butadiene acrylonitrile copolymer, about 300 parts by weight of asbestos; about 370 parts by weight of comminuted mineral wool, and relatively small amounts of vulcanizers and modifying agents.

3. Gasket material comprising about 100 parts by weight each of oil-resistant elastic sulfur-vulcanizable synthetic rubbery materials derived, respectively, from 2,chlorobutadiene 1,3 polymer and from a butadiene acrylonitrile copolymer, about 300 parts by weight of asbestos, about 370 parts by weight of comminuted mineral wool, about 50 parts by weight of thermatomic carbon, and about 94 parts by weight of vulcanizers and modifying agents.

DONALD S. CRAMPTON.